United States Patent [19]

Siegel

[11] Patent Number: 5,418,910

[45] Date of Patent: May 23, 1995

[54] DUAL BUFFER CACHE SYSTEM FOR TRANSFERRING AUDIO COMPACT DISK SUBCHANNEL INFORMATION TO A COMPUTER

[75] Inventor: Mark D. Siegel, Fort Worth, Tex.

[73] Assignee: Tandy Corporation, Fort Worth, Tex.

[21] Appl. No.: 878,733

[22] Filed: May 5, 1992

[51] Int. Cl.⁶ ............................................. G06F 13/00
[52] U.S. Cl. ...................... 395/275; 395/425
[58] Field of Search ........................ 395/425, 275

[56] References Cited

U.S. PATENT DOCUMENTS

| | | | |
|---|---|---|---|
| 4,296,477 | 10/1981 | Hutson | 395/425 |
| 4,587,643 | 5/1986 | Monen et al. | 369/32 |
| 4,641,295 | 2/1987 | Furukawa et al. | 369/32 |
| 5,237,675 | 8/1993 | Hannon, Jr. | 395/425 |
| 5,261,072 | 11/1993 | Siegel | 395/425 |
| 5,291,468 | 3/1994 | Carmon et al. | 369/47 |
| 5,293,409 | 3/1994 | Doornenbal et al. | 325/106 |

OTHER PUBLICATIONS

Sippl et al., *Computer Dictionary and Handbook*, Howard W. Sims & Co., Inc., Copyright 1966 & 1972, p. 418.

Primary Examiner—David L. Robertson
Attorney, Agent, or Firm—Haynes and Boone

[57] ABSTRACT

A method and apparatus are provided for displaying graphical information concurrent with associated audio information within a multimedia computer system. The graphical information (CD+G) and the audio information, is read from a compact disk by a compact disk reader, and decoded by a digital signal processor. The graphical information is stored temporarily in a cache buffer within the compact disk reader and then transferred from the cache buffer to a host computer for display. While the compact disk reader plays the audio, the graphical information is transferred to the host computer for display within the multimedia system.

9 Claims, 3 Drawing Sheets

BUFFER INITIALIZATION PROGRAM

HOST COMPUTER TRANSFER PROGRAM

CACHE TRANSFER PROGRAM

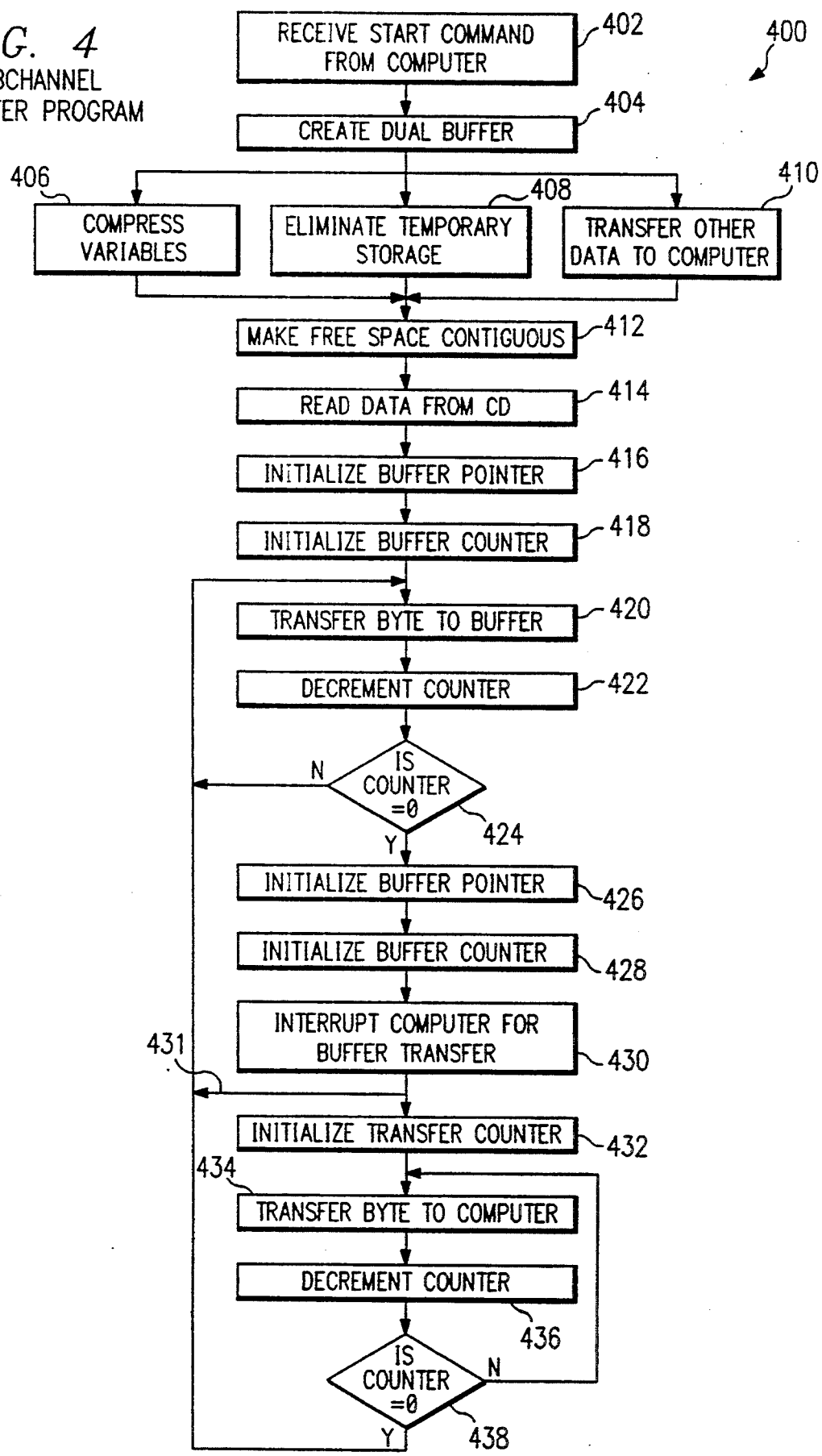

DUAL BUFFER CACHE SYSTEM FOR TRANSFERRING AUDIO COMPACT DISK SUBCHANNEL INFORMATION TO A COMPUTER

FIELD OF THE INVENTION

This invention relates in general to the field of audio compact disks, and particularly to a method and apparatus for obtaining CD+G subchannel graphics information from an audio compact disk for display within a multimedia computer system.

BACKGROUND OF THE INVENTION

An audio compact disk ("CD") consists of a transparent polycarbonate substrate covered by a reflective material, which in turn is covered by a transparent protective layer. A spiral-shaped track is formed within the reflective material which contains successive shallow depressions, also called "pits," wherein digitally encoded information is stored. The length of the pits and the distance between the pits determine the value of the digitally encoded information.

A compact disk decoding system ("CD reader") is utilized to read the encoded information that is stored on a CD, and produce an audio and/or video output. The CD reader includes a read head and a digital signal processor ("DSP"). The read head directs a laser beam onto the CD track wherein the beam is diffracted by the pits in the reflective layer and then received by a photodetector. The photodetector measures the modulated optical signal that is diffracted back from the reflective layer and converts it into a corresponding digital signal for use by the DSP.

The DSP uses the modulated digital signal of the photodetector to produce corresponding decoded digital information. The decoded digital information comprises both digital audio information and digital "subchannel" information. The subchannel information is used for the purposes described below. The modulated signal of the photodetector contains 1,468,800 bits per second of digital information pertaining to the information encoded on the CD. This corresponds to 32 bits of digital audio information produced at 44.1 kilohertz, plus 96 bytes of digital "subchannel" information produced at 7.2 kilohertz (75 times per second). The DSP decodes and separates the digital audio information into two data words which respectively correspond to a left audio channel and a right audio channel. The left and right audio channel information is processed by digital-to-analog converters ("DAC's") that convert the 44.1 kHz digital audio information into analog signals for play on speakers. The DSP also decodes the 96 bytes of subchannel information and provides the decoded information to a central processing unit (CPU) within the CD reader in one of two ways, as discussed below.

Each byte of subchannel information contains 8 bits which are respectively labeled P, Q, R, S, T, U, V & W. The P bit, or P channel, is a flag bit that designates the start of an audio track (i.e, song 1, song 2, etc.). If the P channel equals O, audio information is being read from the CD. If the P channel equals 1, the start of a musical track is designated. In early CD readers, for example, when a user requested the playing of track 3, the processor within the CD reader would find the third occurrence of the P channel equal to 1 and would begin playing audio.

The Q bit, or Q channel, is used for position control in more sophisticated CD readers. The Q channel is encoded into 8-bit bytes to store position information such as track number, pause between music tracks, and time into each track in minutes, seconds and frames. The Q channel bits are read from the subchannel bytes, and de-serialized into 8-bit bytes for decoding by the CPU within the CD reader. Thus, for every eight subchannel bytes read, one 8-bit Q channel byte is available for decoding. Modern CD readers utilize the DSP to extract the Q channel information from the subchannel bytes, and decode the Q channel for position control.

The remaining R through W subchannel bits can be utilized for display of high resolution graphics during audio playback. Utilization of the R-W subchannels for display of graphics during audio playback is known as "CD+G". These six bits contain instructions for line or TV display of text or graphics, as well as scrolling or shifting of the text or graphics. The R-W subchannel bits can be extracted from the subchannel bytes to produce six bits of CD+G information for every subchannel byte that is read. The extracted R-W subchannel bits can then be presented to a host processing system for decoding and display during playback.

Most standard CD players are incapable of utilizing CD+G information to display graphics. When operating in a first mode, the DSP does not decode or provide the subchannel graphics bits R-W to the CPU within the CD reader and therefore does not enable display of the graphics information. Rather, the DSP decodes the P-W subchannel bytes, extracts and decodes the Q-channel bits, and provides the decoded Q-channel information to the CPU within the CD reader. The CPU then utilizes the decoded Q-channel information for the purpose of controlling the selection and play of audio. While the player operating in this mode is adequate to control and play audio, it is incapable of displaying text or graphics along with the audio because the subchannel graphics bits R-W are not decoded by the DSP.

The DSP within a standard CD reader may alternatively operate in a second mode that furnishes the R-W subchannel information to the CPU within the CD reader. In this mode, the subchannel information is provided to the CPU one byte at a time. However, when the DSP is operating in this second mode, the Q-channel bits are not extracted from of the subchannel, and are not de-serialized to provide timing information to the CPU within the CD reader. The CD reader therefore has no way to determine the position of the read head with respect to the CD.

Thus, standard CD readers can be placed in one of two modes. The first mode provides processed and de-serialized Q-channel timing directly to the CPU within the CD reader, but does not provide R-W subchannel information for display of graphics. The second mode provides R-W subchannel information as part of the P-W subchannel byte, but does not perform any processing or de-serializing of the Q-channel for purposes of timing.

An alternative that allows for processing of Q-channel information, as well as for providing subchannel bits R-W, requires the provision of an additional processor within the CD player to read the P-W subchannel information provided by the DSP, extract off the Q channel, and serialize the Q channel information for control and timing. Such a system allows for control and tracking of the audio information through processing of the Q-channel, and for display of graphics through provision of subchannels R-W. However, such an alternative is very costly due to the additional hardware and firmware required to process and decode the Q channel.

What is needed is an arrangement for a standard CD reader in which the P-W subchannel information from the DSP is processed, the Q-channel information is de-serialized, and the information in subchannels R-W is provided for display, utilizing the existing reader configuration and without requiring additional processor hardware.

SUMMARY OF THE INVENTION

The foregoing problems are solved and a technical advance is achieved by a method and apparatus of the present invention in which CD+G subchannel information is read from a compact disk, temporarily buffered within a CD reader, and transferred to a host computer within a multimedia system for display. In a departure from the art, a multimedia system is provided that allows display of CD+G graphics concurrent with the playing of audio, without additional hardware within the CD reader.

In an illustrative embodiment, a multimedia computer system is provided that includes a host computer electrically connected to a compact disk reader, and a software system that executes on both the host computer and the compact disk reader for transferring subchannel information from the compact disk reader to the host computer. The compact disk reader includes an optical read head that reads the subchannel information from a compact disk, a digital signal processor that processes the subchannel information, random access memory that temporarily stores the processed subchannel information, a central processing unit that controls the processing and temporary storage of the subchannel information, and an interface electrically connected to the central processing unit to transmit information to and receive information from the host computer. The host computer includes a central processing unit electrically connected to random access memory to temporarily store transferred subchannel information, a display electrically connected to the central processing unit that provides a visual interface between the host computer and a user, and an interface between the central processing unit of the host computer and the compact disk reader. The software system includes three programs to transfer the compact disk subchannel information from the compact disk reader to the host computer. The first program creates a dual buffer cache within the compact disk reader. The second program temporarily stores the subchannel information in the dual buffer cache. The third software program transfers the temporarily stored subchannel information from the dual buffer cache to the host computer.

Another aspect of the present invention provides a method to deliver P-W subchannel bits to a host computer from a compact disk reader. The P-W subchannel bits are delivered by creating a cache buffer in a random access memory area with the compact disk reader, storing the P-W subchannel bits into the cache buffer, and transferring the P-W subchannel bits from the cache buffer to the host computer. The cache buffer is created by compressing variables that are stored in the random access memory, eliminating temporary storage space within the random access memory, and allocating the remaining data storage within the random access memory so that it is contiguous. The P-W subchannel bits are stored in the cache buffer by reading the subchannel bits from a compact disk, decoding the bits utilizing a digital signal processor, and storing the decoded bits in the cache buffer. The subchannel bits are transferred to the host computer by interrupting the host computer, initializing a transfer counter within the compact disk reader to a value corresponding to the number of bytes to be transferred, transferring a subchannel byte from the cache buffer to the host computer, decrementing the transfer counter, comparing the transfer counter to zero to determine whether all of the subchannel bytes have been transferred, and continuing to transfer the subchannel bytes until the transfer counter equals zero.

An additional aspect of the present invention provides a method for displaying CD+G graphics in a multimedia system by reading digitally encoded information from a compact disk, decoding the information into subchannel information and audio data, temporarily storing the subchannel information into a cache buffer within a compact disk reader, transferring the subchannel information from the cache buffer to a host computer, and displaying the subchannel information on a multimedia display. The decoding of the subchannel information and the audio information is performed by a digital signal processor. The cache buffer within the compact disk reader is created within random access memory, and the transfer of the subchannel information occurs via electronic interfaces that connect the compact disk reader to the host computer.

It is therefore an object of the present invention to provide a method for obtaining both R-W subchannel information and decoded Q channel information from a compact disk utilizing existing CD reader hardware.

It is a further object of the present invention to obtain R-W subchannel information and de-serialized Q channel information from an audio CD utilizing existing CD player hardware, without requiring any additional hardware.

Another object of the present invention is to provide a CD player within a multimedia environment that is capable of playing CD audio and CD+G graphics simultaneously.

A further object of the present invention is to provide a CD player within a multimedia environment that is capable of playing CD+MIDI and CD+G simultaneously.

BRIEF DESCRIPTION OF THE DRAWINGS

The novel features believed characteristic of the present invention are set forth in the appended claims. The invention itself, however, as well as other objects, features and advantages, will be best understood by reference to the following detailed description of an illustrative embodiment when read in conjunction with the accompanying figures, wherein:

FIGS. 3-6 are flow charts illustrating the method of the present invention for buffering audio subchannel information read from a compact disk by the CD reader of FIG. 1.

DESCRIPTION OF THE PREFERRED EMBODIMENT

Figure 1:
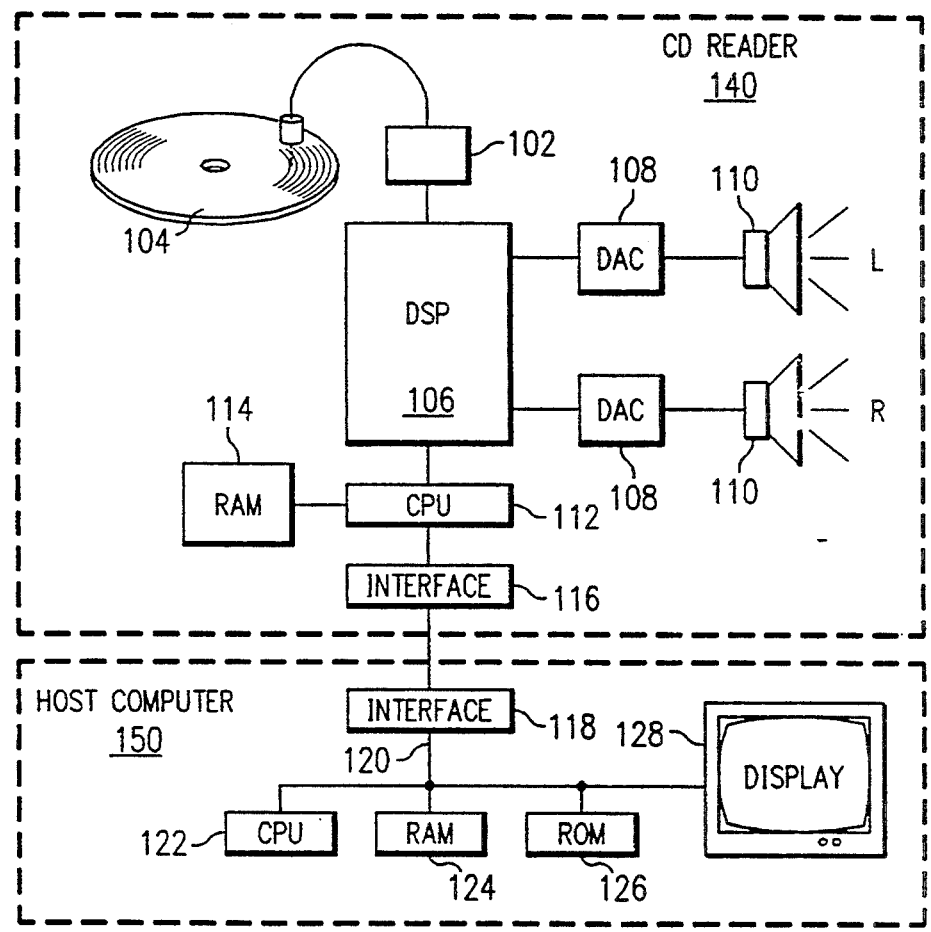
FIG. 1 is a block diagram illustrating a multimedia computer system including a CD reader according to the present invention.

Referring to FIG. 1, a multimedia computer system 100 is shown comprising a compact disk (CD) reader 140 connected to a host computer 150. The CD reader 140 includes an optical read head 102 for optically reading information stored on a compact disk (CD) 104. The optical read head 102 reads digitally encoded information from the CD 104 and provides the read information to a digital signal processor ("DSP") 106. The DSP 106 decodes the read information and provides decoded audio information to digital-to-analog converters ("DAC's") 108 which provide analog signals to speakers 110. The DSP 106 is electrically connected to a central processing unit ("CPU") 112 within the CD reader 140. The CPU 112 is responsible for initiating and controlling the reading of information from the CD 104. The CPU 112 is electrically connected to random access memory ("RAM") 114 for the temporary storage of digital information for the CPU 112. An interface 116 is electrically connected to the CPU 112, and provides an electrical interface between the CD reader 140 and an interface 118 of the host computer 150. The interfaces 116, 118 allow digital information such as address, data and control information to pass between the CD reader 140 and the host computer 150.

The host computer 150 includes the interface 118 electrically connected to a system bus 120, a CPU 122, RAM 124, read only memory ("ROM") 126, and a display 128. It is understood that FIG. 1 shows a simplified block diagram of the host computer 150 and that while not shown, the host computer 150 includes other elements such as power supplies, digital gates, timing circuitry, and other elements typically provided in a personal, multimedia or other computer environment. The CPU 122 is responsible for executing instructions stored in the ROM 126 and for controlling operations within the host computer 150. The RAM 124 provides temporary storage of digital information transmitted to it over the system bus 120. The display 128 provides a visual interface to an operator or user of the host computer 150.

In one embodiment of the invention, the host computer 150 initiates the reading of the CD 104 by transmitting a "play" instruction from the CPU 122 to the CPU 112 over the system bus 120 and through the interfaces 118, 116. When the CPU 112 receives the "play" instruction from the host computer 150, the read head 102 begins providing optically-read data from the CD 104 to the DSP 106 for decoding of the data. The decoded audio data is transmitted by the DSP 106 to the DAC's 108 for the play of left and right audio channel data through the speakers 110. Other information read from the CD 104 by the read head 102 is provided to the DSP 106, then to the CPU 112 and finally to the host computer 150 for processing, as further discussed below.

The information stored on the CD 104 and read by the read head 102 includes 32-bits of digital audio information which is transferred at 44.1 kilohertz, pertaining to left and right audio channel information. In addition, the information includes 96 bytes of subchannel information produced every 1/75th of a second. The subchannel information is decoded by the DSP 106 and provided to the CPU 11.2 for temporary storage in the RAM 114 as 8-bit subchannel bytes. The 8 bits of the subchannel bytes are designated P-W, and relate to timing, control and graphical information associated with the CD 104. In one embodiment of the invention, the subchannel bytes P-W are provided to the host computer 150 for the purpose of controlling the reading of the CD 104, and for display of graphical information on the display 128, as discussed further below.

Figure 2:
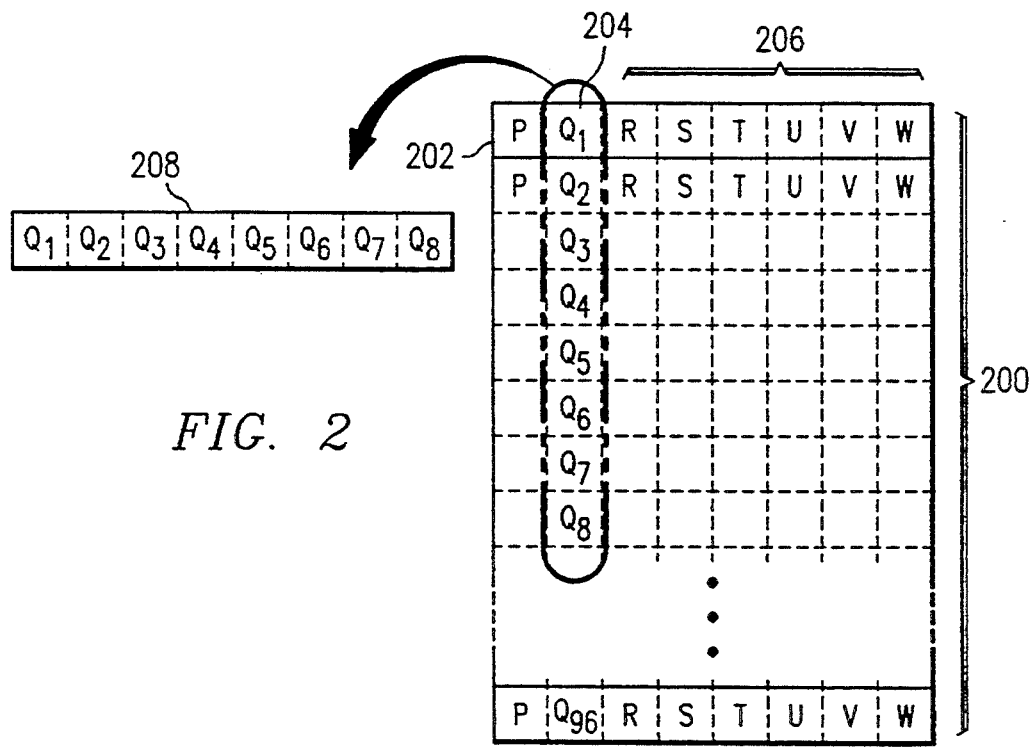
FIG. 2 is a schematic representation of a block of subchannel data contained on a compact disk used with the CD reader of FIG. 1 illustrating the subchannel bits P-W.

FIG. 2 is a schematic representation illustrating the subchannel information contained on the CD 104. In particular, a data block 200 is shown representing the P-W subchannel bytes. The block 200 includes ninety-six bytes of P-W subchannel information arranged vertically as shown in FIG. 2 and designated by the subscript reference numerals 1-96 associated with the Q-channel. A subchannel bit P 202 provides a flag indicating the beginning and end of musical tracks on the CD 104. Subchannel bits Q 204 provide more sophisticated control and position information to the CD reader 140 regarding the position of the read head 102 over the CD 104. The remaining subchannel bits R-W 206 provide graphical information to the host computer 150 via the interfaces 116 and 118. Exemplary graphical information includes text or graphical images for presentation on the display 128.

To obtain accurate information regarding the position of the read head 102 over the CD 104, the reader 140 must read eight contiguous Q-channel bits 204 from eight contiguous subchannel bytes P-W within the subchannel block 200, and serialize the eight Q-channel bits 204 to produce an 8-bit Q-channel byte 208. The Q-channel byte 208 is then used to determine the position of the read head 102 over the CD 104. As discussed above, most CD players utilize the DSP 106 to extract the Q-channel bits 204 from the subchannel block 200 to produce the Q-channel byte 208, and to provide the Q-channel byte 208 to the CPU 112 for control of the read head 102.

In one embodiment of the invention, the DSP 106 is placed into a second mode that delivers the encoded P-W subchannel bytes directly to the CPU 112 for later delivery to the host computer 150. Upon receipt by the host computer 150, the CPU 122 processes the subchannel block 200 to obtain the Q-channel byte 208 for control purposes, and to display R-W subchannel graphics on the display 128. The method for delivering the encoded subchannel block 200 to the host computer 150 is discussed below with reference to FIGS. 3-6.

FIGS. 3-6 are flow charts illustrating the method of the present invention for storing and delivering the subchannel information read from the CD 104 to the host computer 150. It is understood that in the preferred embodiment, the method is implemented by executing computer program instructions stored in the reader 140 and the computer 150 of the system 100. In particular, the program instructions provide a subchannel buffering scheme whereby subchannel bytes P-W are temporarily stored within the RAM 114 of the CD reader 140, and are later transferred from the CD reader to the RAM 124 of the host computer 150. The subchannel bytes P-W enable the positioning and control of the read head 102, and the display of graphics on the display 128. The buffering scheme creates a cache memory area within the RAM 114 for temporarily storing the subchannel bytes before they are transferred to the host computer 150 via the interfaces 116, 118. A cache memory area is also created within the RAM 124 of the host computer 150 for temporarily storing the transferred subchannel bytes, for later processing by the CPU 122.

Figure 3:
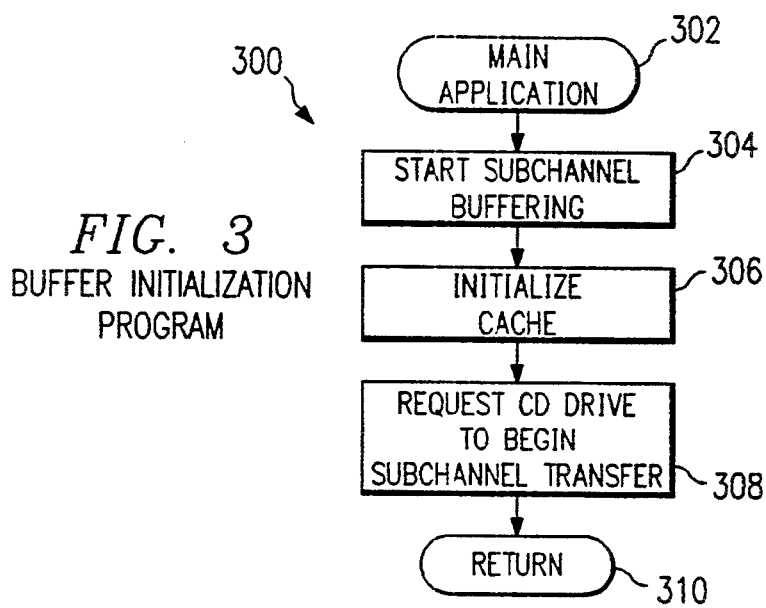

Referring to FIG. 3, a flow chart is shown which illustrates the operation of a buffer initialization program 300 of the present invention. The program 300 is executed on the CPU 122 (FIG. 1). During execution of a main application program (not shown), the CPU 122 calls the buffer initialization program 300 for initializing a data cache (not shown) within the RAM 124 of the host computer 150, and for sending a request to the CD reader 140 to begin transfer of subchannel information to the host computer 150.

Execution of the buffer initialization program 300 begins at step 302 when the main application program places a call. At step 304, subchannel buffering begins. At step 306, the CPU 122 initializes a cache area within the RAM 124 for the temporary storage of subchannel information to be transferred from the CD reader 140. It is understood that the size of the cache area within the RAM 124 that is allocated at step 306 can vary depending on the requirements of the multimedia computer system 100. In one embodiment, the size of the cache within the RAM 124 is 1024 bytes (1K). At step 308, after the cache has been initialized, the CPU 122 sends a start command to the CD reader 140, via the system bus 120 and the interface 118, to begin transferring subchannel information. After sending the start command, the CPU 122 returns to the main application at step 310.

Referring to FIG. 4, a flow chart is shown which illustrates operation of a subchannel information transfer program 400. The subchannel information transfer program 400 is executed on the CPU 112 within the CD reader 140. The program 400 creates a cache area (not shown) within the RAM 114 for temporarily storing subchannel information read from the CD 104, stores the subchannel information within the cache area, and transfers the subchannel information stored in the cache area to the host computer 150.

Execution of the program 400 begins at step 402 when the CPU 112 receives the start command from the host computer 150 as discussed with reference to step 308 of FIG. 3. The start command from the host computer 150 requests the CD reader 140 to read data from the CD 104, decode the data within the DSP 106, provide the decoded audio channel portion of the data to the DAC's 108 for play on the speakers 110, and provide the subchannel information to the host computer. It is understood that once the read head 102 begins the process of reading data stored on the CD 104, the read data is continuously provided to the DSP 106 for decoding. The DSP 106 then provides decoded audio data continuously to the DAC's 108, and subchannel information continuously to the CPU 112.

At step 404, the CPU 112 creates a dual cache buffer (not shown) within the RAM 114. The dual buffer is a contiguous memory space within the RAM 114 for temporarily storing subchannel information read from the CD 104 before it is transferred to the host computer 150. The two portions of the dual buffer are of equal or similar sizes. In one embodiment, the dual buffer includes two portions of 32 bytes each. The dual buffer allows the CPU 112 to store subchannel information into one portion while transferring out of the second portion the previously stored subchannel information, as further described below.

It is understood that prior to the execution of the program 400, the RAM 114 contains data that is utilized by the CPU 112 in the reading of information from the CD 104. To create enough free memory space within the RAM 114 for use as a dual buffer, the existing data needs to be reallocated. A combination of three techniques are used to reallocate the existing memory structure of the RAM 114. These techniques include a compress variables step 406, an eliminate temporary storage step 408, and a transfer other data to host computer step 410. These three steps analyze the data that is resident within the RAM 114 to determine which data must be saved and made readily available to the CPU 112, which data must be saved but can be compressed or archived for later retrieval, and which data can be deleted. The compress variables step 406 takes all of the data within the RAM 114 that must be saved but can be compressed for later retrieval, and compresses this data utilizing a data compression algorithm. It is understood that many data compression algorithms may be used, such as PKZIP by PKWARE Inc., or LHarc by Yoshi. The eliminate temporary storage step 408 deletes the data in the RAM 114 that is not required by the CPU 112 to read data from CD 104. The transfer other data to host computer step 410 gathers all of the data that must be saved but can be archived, and transfers this data to the host computer 150 via the CPU 112 and the interface 116. It is understood that the data that has been compressed or archived by the above steps may be decompressed and restored by similar programs (not shown).

Once a sufficient amount (approximately 64 bytes) of free space has been created within the RAM 114 by execution of steps 406-410, step 412 reallocates the existing data structure to make the free space contiguous.

At step 414, the read head 102 begins reading the CD 104 and transmitting the read information to the DSP 106 for processing.

At step 416, the CPU 112 initializes a buffer pointer (not shown) to correspond to the address of the memory location within the dual buffer of the RAM 114 where the first byte of subchannel information will be stored. At step 416, this address is the first available memory space within the first half of the dual buffer. It is understood that the buffer pointer is a binary value that may be stored in a register within the CPU 112, or in the RAM 114.

At step 418, the CPU 112 initializes a buffer counter (not shown) to correspond to the number of subchannel bytes that will be stored in a first half of the dual buffer. In one embodiment of the invention, the buffer counter is equal to 32 bytes.

At step 420, the CPU 112 receives a first subchannel byte from the DSP 106, that was read by the read head 102 from the CD 104. The CPU 112 takes the read subchannel byte and stores it in the memory location within the dual buffer corresponding to the address stored in the buffer pointer.

At step 422, the buffer counter is decremented. The value in the buffer counter now equals the number of bytes remaining in one half of the dual buffer within the RAM 114.

At step 424, the CPU 112 compares the value of the buffer counter with zero. If the buffer counter does not equal zero, one half of the dual buffer still has memory space available for storing subchannel bytes. Accordingly, a software loop is entered and execution returns to step 420 for the transfer of another byte of subchannel data from the DSP 106. The subchannel byte is stored in the next available memory space within the dual buffer, the buffer counter is decremented, and the step 424 comparison is performed again. If at step 424 the buffer counter equals zero, then one-half of the dual buffer is full, meaning that no more subchannel bytes may be stored in that one half. Execution therefore proceeds to step 426.

At step 426, the CPU 112 initializes the buffer pointer to correspond to the address of the memory location within the second half of the dual buffer where the next byte of subchannel information will be stored.

At step 428, the CPU 112 initializes the buffer counter to correspond to the number of subchannel bytes that will be stored in a second half of the dual buffer. As specified previously, thirty-two bytes of subchannel information are stored in each half of the dual buffer in one embodiment of the invention. Therefore, the buffer counter is set equal to thirty-two. At this point, execution proceeds along two paths. After step 428, line 431 initiates the subchannel buffering loop of steps 420-424. In addition, execution proceeds to step 430 as further discussed below. It is understood that the execution of the subchannel buffering loop, and the method of steps 430-438 are executed concurrently.

At step 430, the CPU 112 sends an interrupt signal via the interface 116 to interrupt the host computer 150. The interrupt signal initiates the transfer of subchannel data bytes from the dual buffer within the CD reader 140, to the cache within the RAM 124 of the host computer. The CPU 112 then begins transferring the subchannel bytes stored in the full half of the dual buffer to the host computer 150, by executing steps 432, 434, 436 and 438, as will be further described below. While the CPU 112 is executing these steps, the host computer 150 executes the host computer transfer program 500 shown in FIG. 5 and discussed in detail below.

An arrow 431 in the flow chart of FIG. 4 represents a connection between the interrupt step 430 and the subchannel transfer loop beginning at step 420. The purpose of this connection is to signify that the storage of subchannel bytes into the dual buffer, and the transfer of subchannel bytes to the host computer 150, are not sequential operations, per se. Rather, the operations occur concurrently such that the CPU 112 can store a subchannel byte in one half of the dual buffer, and then transfer one or more subchannel bytes out of the other half of the dual buffer to the host computer 150. Thus, while one half of the dual buffer is being filled with subchannel bytes provided by the DSP 106, the other half of the dual buffer is being transferred to the host computer. In operation, the CPU 112 transfers the subchannel bytes in one half of the dual buffer to the host computer while the other half of the dual buffer is being filled by steps 420, 422 and 424. This allows the subchannel bytes to be continuously transferred from the DSP 106 to the CPU 112 and then to the dual buffer without interruption. When one half of the dual buffer is full, the CPU 112 begins filling the other half while transferring the full half to the host computer 150. The CPU 112 fills the half-portions of the dual buffer alternately to allow for continuous storage of subchannel bytes provided by the DSP 106.

At step 432, a transfer counter is initialized to correspond to the number of subchannel bytes to be transferred from the full half of the dual buffer to the host computer 150. In one embodiment of the invention, the transfer counter equal 32 bytes.

At step 434, the CPU 112 transfers a subchannel byte from one half of the dual buffer to the host computer, via the interface 116. The transfer counter is decremented at step 436 and then compared to zero at step 438. If the transfer counter is not equal to zero, execution returns to step 434 to form a subchannel transfer loop. This transfer loop continues until all of the subchannel bytes in the current half of the dual buffer have been transferred to the host computer 150. When the transfer counter is equal to zero, all of the subchannel bytes in the current half of the dual buffer have been transferred to the host computer 150 and execution proceeds back to step 420 where the other half of the dual buffer is being filled.

Figure 5:
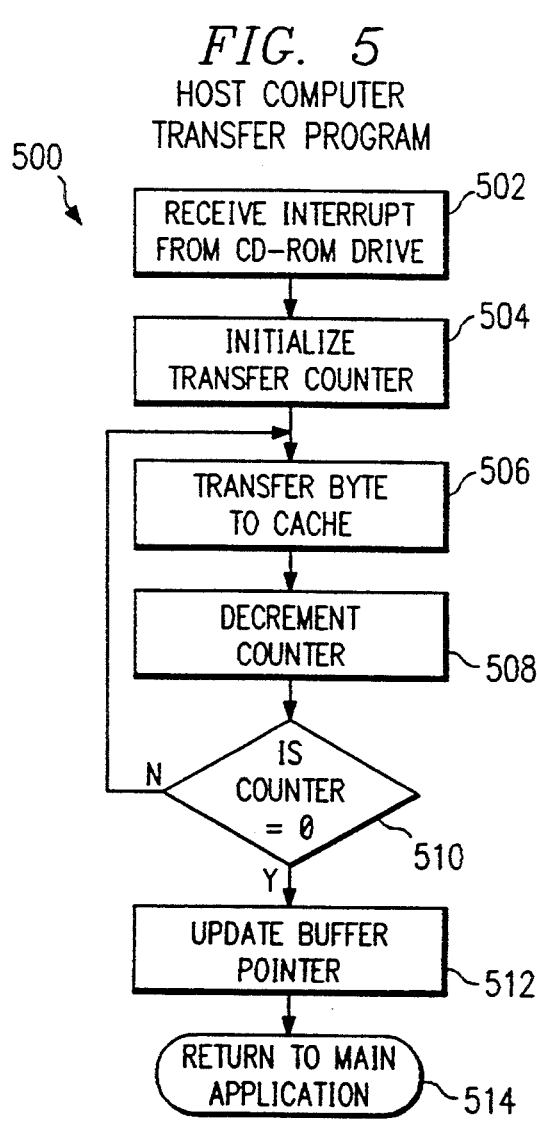

Referring to FIG. 5, a flow chart representing the host computer transfer program 500 is shown. The transfer program 500 executes on the CPU 122 within the host computer 150 and performs the transfer of subchannel bytes from the CD reader 140 to the cache area within the RAM 124.

At step 502, the CPU 122 is interrupted by the CD reader 140 when the CPU 112 sends an interrupt signal via the interface 116, as described above in step 430 of FIG. 4. The interrupt signal causes the CPU to halt execution of the main application and begin the transfer program 500 at step 502.

At step 504, the CPU 122 initializes a transfer counter (not shown) to correspond to the number of subchannel bytes to be transferred from the CD reader 140. In one embodiment of the invention, the transfer counter is set equal to 32 bytes.

At step 506, the CPU 122 receives a subchannel data byte via the interface 118 from the CD reader 140 and stores it into the cache area within the RAM 124. The CPU 122 decrements the transfer counter at step 508 and proceeds to step 510.

At step 510, the CPU 122 compares the value of the transfer counter with zero to determine whether all of the bytes to be transferred from the CD reader 140 have been transferred. If the transfer counter does not equal zero, the CPU 122 returns to step 506 to form a transfer loop, which continues transferring subchannel bytes from the CD reader 140 to the cache area within the RAM 124. If the transfer counter equals zero, all of the subchannel bytes to be transferred from the CD reader 140, have been transferred. Therefore, the CPU 122 updates a buffer pointer at step 512, that is used to determine free space within the cache area, and returns to the main application at step 514.

Figure 6:
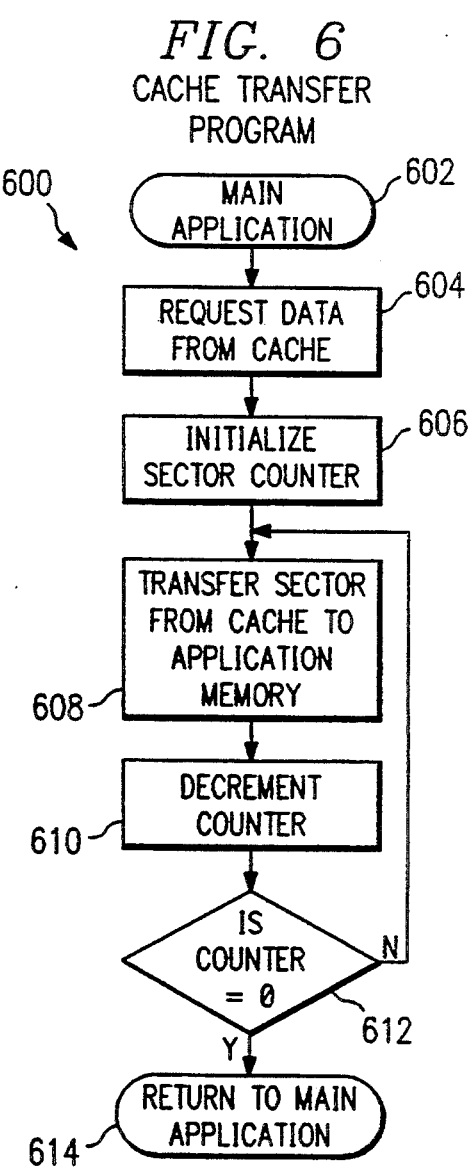

Referring to FIG. 6, a flow chart representing a cache transfer program 600 is shown. The cache transfer program 600 is utilized by the CPU 122 whenever the main application within the host computer 150 requires access to the subchannel information stored in the cache area within the RAM 124.

When the main application requires access to the subchannel information, a call is made to the cache transfer program 600 at step 602. At step 604 the main application program requests data to be transferred from the cache area. A sector counter (not shown) is initialized at step 606 to correspond to the number of sectors required by the main application. In one embodiment of the invention, one sector is equal to 96 bytes of subchannel information. It is understood that the sector counter is a binary value that may be stored within a register of the CPU 122, or within a memory location within the RAM 124.

At step 608, the CPU 122 begins transferring a sector, one byte at a time, from the cache area within the RAM 124, to an area within the RAM 124 allocated for application memory. After a sector has been transferred to the application memory area, the CPU 122 decrements the sector counter at step 610 and proceeds to step 612.

At step 612, the CPU 122 compares the sector counter with zero to determine whether all of the sectors requested by the main application have been transferred to the application memory area. If the sector counter is not equal to zero, the CPU 122 jumps to step 608 to begin transferring another sector. The sector transfer loop continues until all of the requested sectors have been transferred. If the sector counter is equal to zero at step 612, all of the requested sectors have been transferred. Execution therefore proceeds to step 614 which returns control of the CPU 122 to the main application.

Once the subchannel information is transferred from the CD reader 140 to the host computer 150, the CPU 122 is able to extract the Q-channel bits and decode them to obtain position and timing information relative to the read head 102 over the CD 104. In addition, the CPU 122 is also able to display the information contained in the R-W subchannel bits on the display 128. In operation, the above embodiment allows Q-channel information to be processed for purposes of timing and control, and CD+G subchannel graphics to be displayed within a multimedia computer system 100.

Alternative embodiments of the present invention include a CD reader within a multimedia environment wherein the information contained on a CD includes digital data other than audio information. The data may include software programs, database information, full text documents, or other types of digitally stored information. It is understood that in such an embodiment, the information is stored on the CD in a manner similar to that discussed above. As the information is processed by the DSP, the CD+G subchannel information is extracted and provided to the host computer.

Although illustrative embodiments of the invention have been shown and described, a latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A multimedia system comprising:
   an optical read head for reading subchannel information stored on a Compact Disk Read-Only Memory (CD ROM);
   a host computer;
   a dual buffer including first and second portions for storage of said subchannel information, said dual buffer being electrically connected to said optical read head and to said host computer; and
   means for transferring said read subchannel information from said optical read head to one of said first and second portions for storage while simultaneously transferring subchannel information stored in the other of said first and second portions to said host computer.

2. The system of claim 1 further comprising means for generating an interrupt signal to said host computer for initializing said host computer prior to the transfer of said stored subchannel information from said dual buffer to said host computer.

3. The system of claim 1 further comprising:
   a digital signal processor (DSP) connected to said optical read head for decoding said read subchannel information before it is transferred to said dual buffer; and
   a central processing unit (CPU) for controlling operation of said optical read head, said CPU connecting said DSP to said buffer and to said computer.

4. The system of claim 1 wherein said subchannel information includes P-W subchannel bits.

5. A method for transferring subchannel information stored on a Compact Disk Read-Only Memory (CD ROM) to a host computer, the method comprising:
   using an optical read head to read said subchannel information stored on said CD ROM;
   storing said read subchannel information in a first portion of a dual buffer until said first portion is full;
   responsive to said first portion being full, storing said read subchannel information in a second portion of said dual buffer while simultaneously transferring said read subchannel information stored in said first portion to said host computer until said second portion is full.

6. The method of claim 5 further comprising:
   responsive to said second portion being full, storing said read subchannel information in said first portion while simultaneously transferring said read subchannel information stored in said second portion to said host computer until said first portion is full.

7. The method of claim 5 further comprising, before said transferring said read subchannel information stored in said first portion to said host computer, sending an interrupt signal to said host computer for initializing said computer to receive said transferred subchannel information from said dual buffer.

8. The method of claim 5 further comprising, before said transferring said read subchannel information stored in said first portion to said host computer, decoding said subchannel information utilizing a digital signal processor.

9. The method of claim 5 wherein said subchannel information includes P-W subchannel bits.

* * * * *